US 7,099,727 B2
Aug. 29, 2006

(12) United States Patent
Wu et al.

(10) Patent No.: US 7,099,727 B2
(45) Date of Patent: Aug. 29, 2006

(54) KNOWLEDGE REPOSITORY SYSTEM FOR COMPUTING DEVICES (75) Inventors: Yuh-Cherng Wu, San Jose, CA (US); Huiling Gong, Sunnyvale, CA (US)

(73) Assignee: SAP Aktiengesellschaft, Walldorf ( * ) Notice: Subject to any disclaimer, the term of this patent is extended or adjusted under 35 U.S.C. 154(b) by 226 days.

(21) Appl. No.: 10/622,265

(22) Filed: Jul. 17, 2003

(65) Prior Publication Data

US 2004/0083194 A1 Apr. 29, 2004

Related U.S. Application Data (60) Provisional application No. 60/421,650, filed on Oct. 25, 2002.

(51) Int. Cl.
G06F 19/00 (2006.01)

(52) U.S. Cl. .............. 700/104; 700/49; 700/97; 706/45

(58) Field of Classification Search .............. 700/28, 700/48, 90, 95, 97, 104; 706/45, 61
See application file for complete search history.

(56) References Cited

U.S. PATENT DOCUMENTS

| | | | | | |
|---|---|---|---|---|---|
| 4,930,071 | A | * | 5/1990 | Tou et al. ................ | 707/4 |
| 5,233,513 | A | * | 8/1993 | Doyle ...................... | 705/7 |
| 5,487,135 | A | * | 1/1996 | Freeman .................. | 706/59 |
| 5,751,914 | A | * | 5/1998 | Coley et al. ............. | 706/47 |
| 5,978,594 | A | * | 11/1999 | Bonnell et al. .......... | 710/17 |
| 6,226,792 | B1 | * | 5/2001 | Goiffon et al. .......... | 717/120 |
| 6,292,792 | B1 | * | 9/2001 | Baffes et al. ............ | 706/45 |
| 6,470,227 | B1 | * | 10/2002 | Rangachari et al. .... | 700/95 |
| 6,526,387 | B1 | * | 2/2003 | Ruffin et al. ............ | 705/7 |
| 6,574,621 | B1 | * | 6/2003 | Lautzenheiser et al. | 707/4 |
| 6,766,368 | B1 | * | 7/2004 | Jakobson et al. ........ | 709/224 |
| 2002/0165841 | A1 | * | 11/2002 | Quaile .................... | 706/45 |
| 2002/0184140 | A1 | * | 12/2002 | Quaile et al. ........... | 705/38 |
| 2003/0131075 | A1 | * | 7/2003 | Bear et al. .............. | 709/219 |

FOREIGN PATENT DOCUMENTS

EP 1209617 5/2002

OTHER PUBLICATIONS

Craven et al. "Learning to Construct Knowledge Bases From The World Wide Web," *Artificial Intelligence*, 2000, vol. 188, pp. 69–113.

Hacid et al. "A Database Approach for Modeling and Querying Video Data," *IEEE Transactions on Knowledge and Data Engineering*, Sep./Oct. 2000, vol. 12, No. 5, pp. 729–750.

J. Sukarno Mertoguno, "Distributed Knowledge–Base: Adaptive Multi–Agents Approach," *International Journal on Artificial Intelligence Tools*, 1998, vol. 7, No. 1, pp. 59–70.

McKay, "Kflow Knowledge Management: Built to Leverage the Way We Think", *CIRI Lab Inc.*, obtained from www.cirilab.com, document undated, 6 pages.

"Generate Run–Time Diagnostic Knowledge Base Tools", *Giordano Automation*, obtained at http:www.giordano.com/Products/genrun.htm, document said to be last modified on Dec. 28, 2001, printed from the Internet on Nov. 6, 2003, 1 page.

(Continued)

Primary Examiner—Jayprakash N. Gandhi
(74) Attorney, Agent, or Firm—Fish & Richardson P.C., P.A.

(57) ABSTRACT

A system is disclosed that generates a data source representation using at least one data source. The system includes a set of services that synchronize the data source representation with the data source, or sources, from which the data source representation is generated. The system also includes a set of services that operate on a data source representation to access and manage information stored in a data source, or sources, from which the data source representation is generated.

32 Claims, 4 Drawing Sheets

OTHER PUBLICATIONS

"Generate Run–Time Diagnostic Knowledge Base", *Giordano Automation*, obtained at http://www.giordano.com/help/sect7.htm, printed from the Internet on Nov. 6, 2003, 19 pages.

"E–Service with Advanced Workflow", *Q–Link Technologies*, obtained from http://www.realmarket.com/news/qlinktech040500.html, printed from the Internet on Feb. 10, 2004, 2 pages.

"Business Process Modeling Language", obtained at http://ww.bpmi.org/bpml.esp, printed from the Internet on Feb. 11, 2004, 1 page.

A. Arkin "Business Process Modeling Language (BPML)" 2000, obtained at http://www.bpml.org, 67 pages.

Screen Shots of a Wizard Builder sold by SAP AG, 7 sheets.

Islam et al., "An Essential design Pattern for Fault–Tolerant Distributed State Sharing", *Communication of the ACM*, XP–002326281, vol. 39, No. 10, Oct. 1996, pp. 65–74.

Gamma et al., *Design Patterns Elements of Reusuable Object–Oriented Software*, Chapter 1, pp. vii–30, Published 1995.

Gamma et al., "Proxy Object Structural", XP–2326333A, pp. 207–217, Sep. 1999.

Gamma et al., "Observer Object Behavioral", XP2326333A, pp. 293–303, Sep. 1999.

Lesser et al., "BIG: An Agent for Resource–Bounded Information Gathering and Decision Making," *Artificial Intelligence*, 118 (2000) 197–244.

* cited by examiner

KNOWLEDGE REPOSITORY SYSTEM FOR COMPUTING DEVICES

CROSS-REFERENCE TO RELATED APPLICATIONS

This application claims the benefit of U.S. Provisional Patent Application Ser. No. 60/421,650, filed on Oct. 25, 2002.

TECHNICAL FIELD

This invention relates to a knowledge repository system for computing devices.

BACKGROUND

In today's business environment, organizations consider information management critical to their success. Typically, organizations use computer application software to collect and manage data from varied sources. These sources include customer relations, financial planning, marketing, human resources and manufacturing. Traditionally, organizations have stored such data in heterogeneous systems and in varied formats. This has resulted in a tremendous amount of information being collected and stored in numerous diverse and often unconnected computer systems and databases. Furthermore, relationships between pieces of data in varied formats and among heterogonous databases are typically inadequate or difficult in establishing. As a result, critical business and management decisions are often made based on an incomplete set of information.

SUMMARY

A system is disclosed that generates a data source representation using at least one data source. The system includes a set of services that synchronize the data source representation with the data source, or sources, from which the data source representation is generated. The system also includes a set of services that operate on a data source representation to access and manage information stored in a data source, or sources, from which the data source representation is generated.

For example, according to one aspect, a method includes generating at least one knowledge entity wherein each generated knowledge entity is generated from at least one data source and represents the at least one data source from which the generated knowledge entity was generated; storing the at least one knowledge entity in a knowledge base; as well as providing a set of knowledge services that synchronize each generated knowledge entity with the at least one data source from which the knowledge entity was generated.

In some implementations, the method also may include a service that updates the at least one knowledge entity in response to receiving an event representing a change in the at least one data source from which the at least one knowledge entity was generated.

In some implementations, the method also may include a service that updates the at least one data sources from which the at least one knowledge entity was generated in response to receiving an event representing a change in the at least one knowledge entity.

According to another aspect, the method also may include providing a set of data retrieval services that access the at least one data source from which the at least one knowledge entity was generated; and a set of data conversion services that translate data content, the data content stored in the at least one data source from which the at least one knowledge entity was generated, to an alternative format.

A system, as well as articles that include a machine-readable medium storing machine-readable instructions for implementing the various techniques, are disclosed. Details of various implementations are discussed in greater detail below.

In some embodiments, one or more of the following advantages may be present. For example, the knowledge repository system may result in substantial efficiencies and organizational effectiveness by integrating heterogeneous data sources and reducing data redundancy. For example, the system may minimize traditional functional "silo effects" in organizations due to geographic isolation and individualism.

An additional benefit of the system may relate to organizational productivity. Productivity may be gained as a result of seamless operation and cycle time reductions driven by standard data interfaces to heterogeneous data sources.

Another benefit of the system may relate to documentation efficiency through electronic maintenance of a common repository. The knowledge repository system may be a foundation for comparative analysis and reporting and comprise required information for business and management decisions.

Another advantage of the system may relate to the development of business applications. In particular, business applications may process information independent of underlying data source structures. Another related advantage may relate to providing a known and defined data interface for business applications. Processes employed by business applications may be completely encapsulated inside knowledge base components so that knowledge of underlying data structures need not be known by business applications.

Additional features and advantages will be readily apparent from the following descriptions and attachments.

BRIEF DESCRIPTION OF THE DRAWINGS

Like reference symbols in the various drawings indicate like elements.

DETAILED DESCRIPTION

Figure 1:
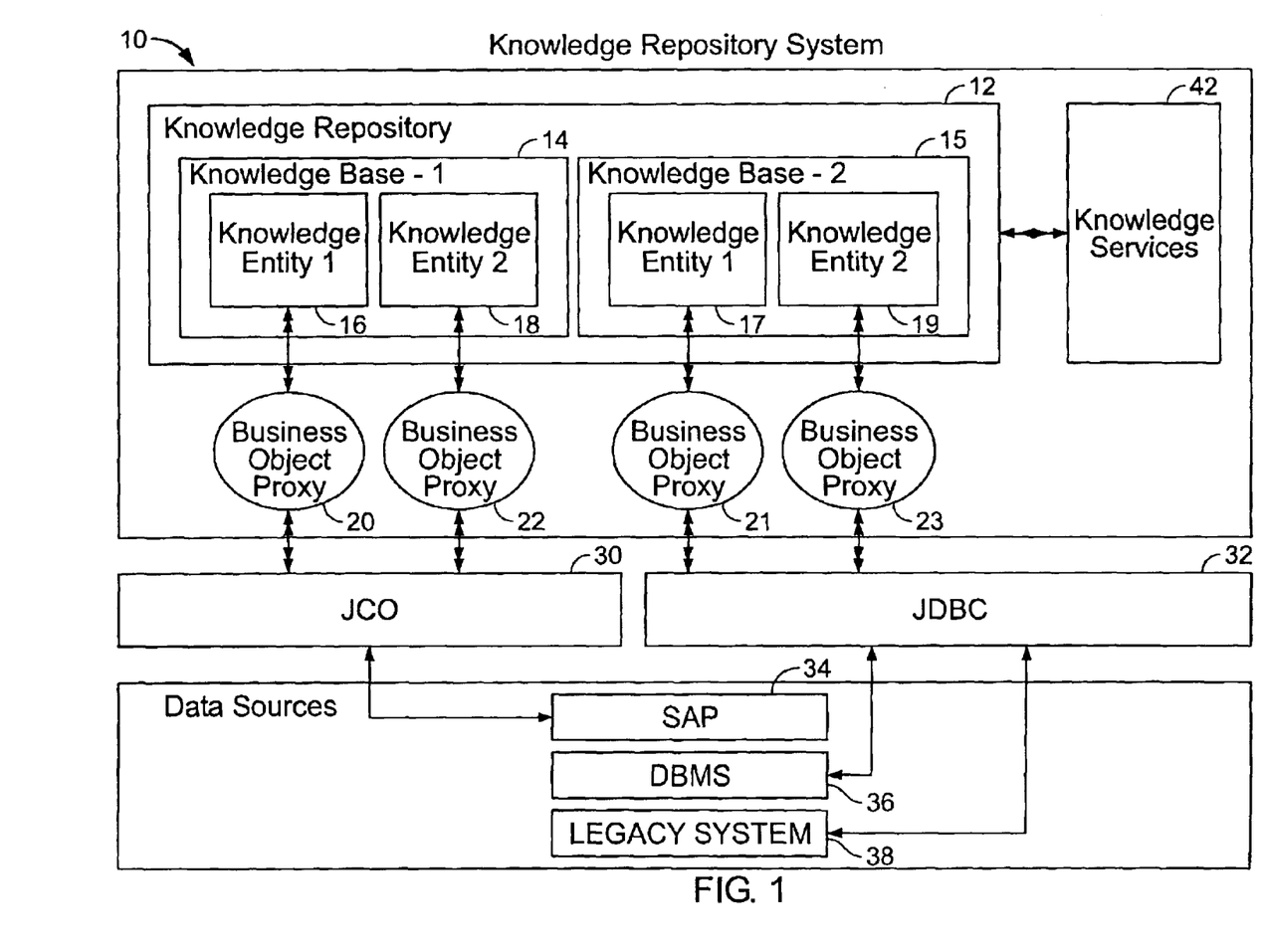
FIG. 1 illustrates components of a knowledge repository system.

Referring to FIG. 1, a computer-based system 10 is disclosed that provides a generic framework for the migration, synchronization, and aggregation of stored data from multiple and distributed data sources.

As illustrated in FIG. 1, the system 10 includes a knowledge repository 12 that provides a storage area for knowledge in computer-based system 10. In one embodiment, knowledge repository 12 may be a file-based system that may store one or more knowledge bases. In other embodiments, a database management system may be used to store one or more knowledge bases. Although only a single knowledge repository 12 is illustrated in FIG. 1, the system may be configured to support multiple knowledge repositories that may be distributed across multiple computer devices.

Referring to FIG. 1, knowledge bases 14, 15 may be provided that aggregate and store information for knowledge retrieval in knowledge repository 12. Knowledge bases 14, 15 may include a collection of documents such as electronic mail (e-mail messages), web pages, business documents, etc. that may be searched and organized for users. In some embodiments, knowledge bases 14, 15 may be organized as a collection of knowledge that may be expressed using various knowledge representation languages. The most popular knowledge representation languages may include logic rules, production rules, semantic networks and frames. Although only two knowledge bases 14, 15 are illustrated in FIG. 1, knowledge repository 12 may be configured to support one or more knowledge bases.

Referring to FIG. 1, knowledge entities 16, 17, 18, and 19 may be provided that represent aggregated collections of business objects that may be stored in knowledge bases 14, 15. In one embodiment, knowledge entities store meta-definitions that reference one or more business objects rather than the actual data content of business objects. Several benefits may stem from this design. For example, storing meta-definitions may simplify data synchronization between data sources and knowledge entities at an identifier level as to avoid content inconsistency. In addition, any structural changes in business objects may be easily reflected in meta-definitions. Furthermore, storing meta-definitions may minimize disk storage requirements of the system.

Figure 2:
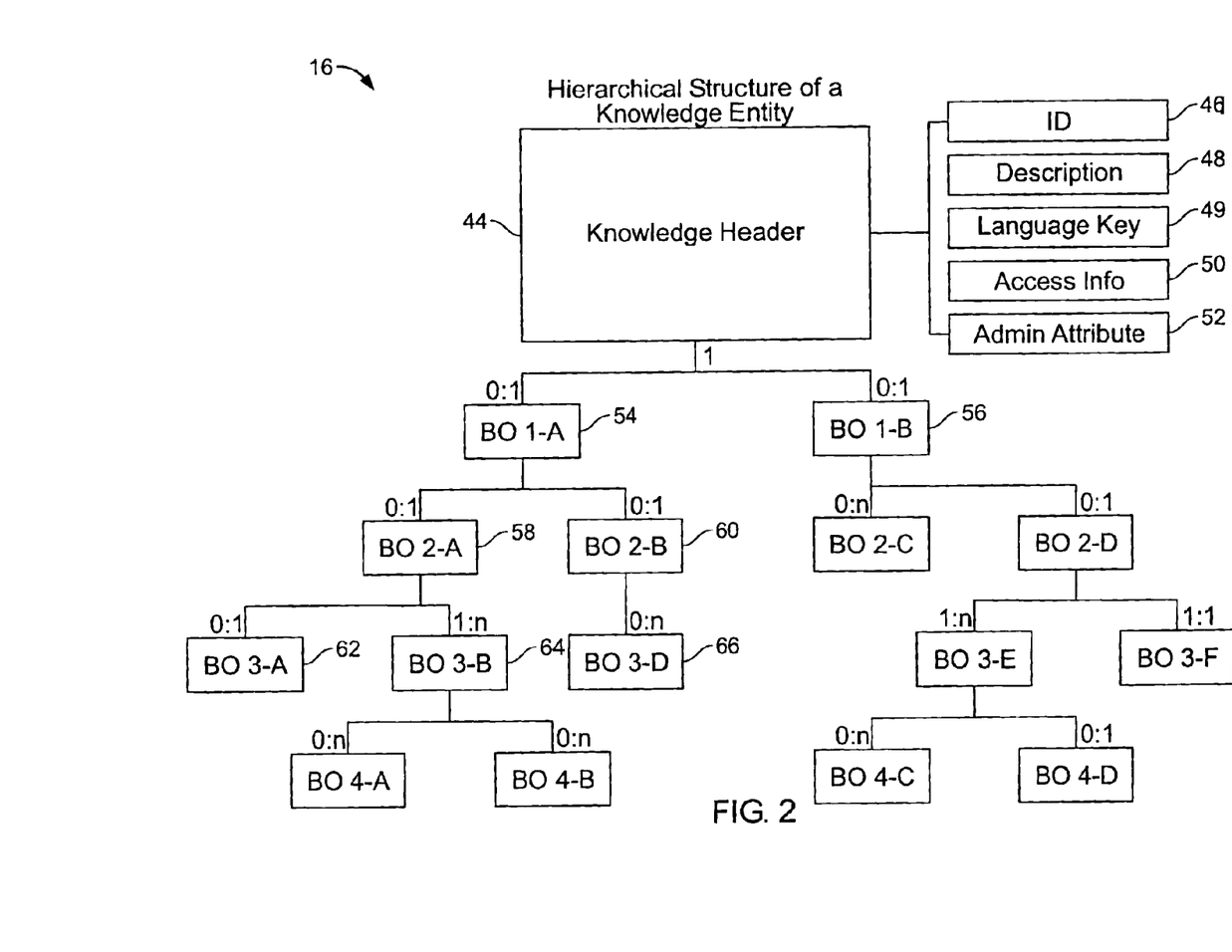
FIG. 2 illustrates a hierarchical structure for a knowledge entity.

FIG. 2 discloses the structure of an exemplary knowledge entity. As illustrated in FIG. 2, knowledge entities may be organized into hierarchical structures that include sub-entities representing one or more business objects. In one embodiment, sub-entities may be arranged in a parent and child relationship that have no limitation regarding depth of relationship. Each sub-entity in the structure may correspond to a particular business object. In other embodiments, a sub-entity may correspond to one or more business objects.

Referring to FIG. 2, knowledge entities also may include a knowledge header 44. Knowledge header 44 contains administrative information relating to a knowledge entity. In one embodiment, Knowledge header 44 may include an ID attribute 46 that uniquely identifies the knowledge entity to the system, a description attribute 48 that describes the collection of information the knowledge entity represents, a language key 49 that describes an international language that may be used in the knowledge entity, an access attribute 50 that may store access authority information for the knowledge entity and an administrative attribute 52 that may contain information relating to knowledge entity creation, access and modification.

Sub-entities may be included in knowledge entities that collectively represent a logical grouping of data. Each sub-entity may include business object attribute information that represents a mapping to a particular business object. As illustrated in FIG. 2, sub-entities may be organized hierarchically and reference one or more additional business objects. For example, referring to FIG. 2, sub-entity 54 may include a mapping to a purchase order. Sub-entity 54 may map attributes relating to a customer order that include a customer name, quantity of order and price. As illustrated in FIG. 2, sub-entity 54 may also contain mappings to other sub-entities 58, 60 that reference different business objects such as an inventory business object and an accounts receivable business object. As a result, knowledge entities may represent a hierarchical relationship between sub-entities that have meaning to a particular business process. The business objects represented in a knowledge entity may access different database tables, or different database tables in different systems external to the system.

Referring to FIG. 2, the numbers shown on the hierarchical links between sub-entities represent entity cardinality (e.g., 0:1 means that zero or one business object may associate to a parent business object, 1:n means that one or more business objects may associate to a parent business object) and describe the mapping of business objects to each other. For example, as illustrated in FIG. 2, sub-entity 58 entitled "BO 2-A" may have none or one "BO 3-A" (element 62) business objects as its child and one or more "BO 3-B" (element 64) business objects as its children.

In one embodiment, the derivation of relationships between sub-entities in a knowledge entity may be established using extensible markup language ('XML'). Various XML tools capable of creating relationships between business objects may be used to establish mapping between business objects and sub-entities for knowledge-entities.

Figure 3:
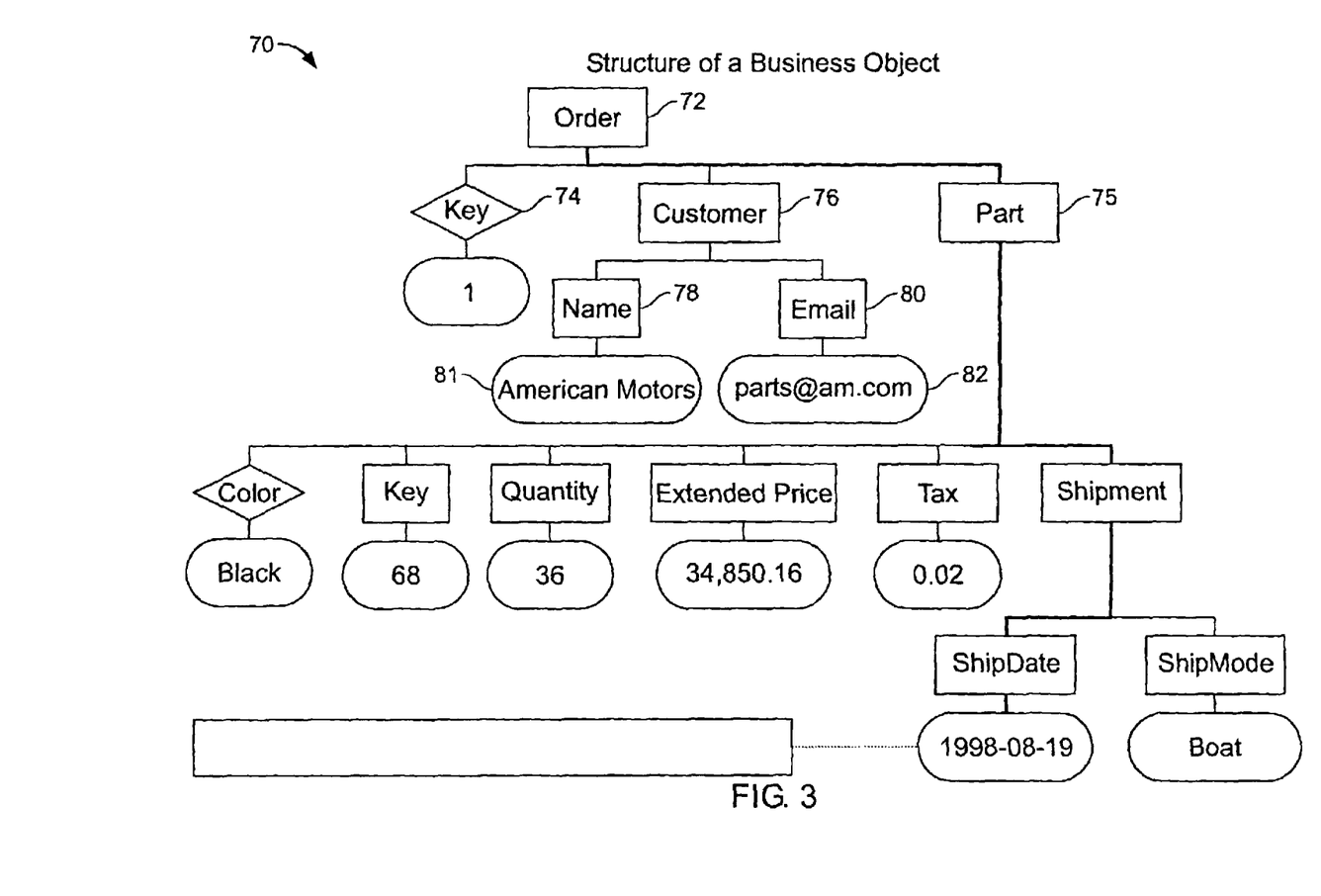
FIG. 3 illustrates the structure of a business object.

FIG. 3 is illustrative of a business object structure for an order business object. The structure of a business object is dependent upon the business process it is designed for. As shown in FIG. 3, a business object may contain attribute-value pairs. In addition, business objects may have one or more additional business objects associated with it. For example, as illustrated in FIG. 3, the order sub-entity 72 may have associated with it a key attribute 74, a customer business object 76 and a part business object 75. As shown in FIG. 3, the lower levels of a business object hierarchy may have associated with it attribute-value pairs. For example, customer business object 76 may have a name attribute 78 and an associated value 81 ("American Motors") as well as an electronic mail attribute 80 and an associated value 82 ("parts@am.com"). In addition, each business object may have its own set of pre-defined connections that map to a data source (i.e., a data base table, a data model in an enterprise resource planning ("ERP") system, one or more documents, etc.). Business objects may be shared by multiple knowledge entities in multiple knowledge bases.

Referring to FIG. 1, business object proxies 20, 22, 21, 23 may be provided by the system that initiate data retrieval and storage. Although four business object proxies are illustrated in FIG. 1, the system may be configured to support one or more business object proxies. Business object proxies 20, 22, 21, 23 also map knowledge entity attribute definitions to one or more business object attributes. In one embodiment, business object proxies 20, 22, 21, 23 may be implemented in the Java™ programming language and inherit the set of data access methods that have been established for a particular business object for the storage and retrieval of data. Business object proxies 20, 22, 21, 23 also may inherit pre-defined connections to data including a customer relationships management system, a business warehouse ODS server, a search engine server, and legacy systems. In one embodiment, UML tools may be utilized to establish the properties and relationships associated with a business object in business object proxies 20, 22, 21, and 23.

In one embodiment, business object proxies may represent business objects as a java class associated with a particular data source. Once instantiated, business object proxies may access data mapping information stored in knowledge entities and instantiate business objects using one or more access methods defined for a particular business object. The persistent layer of the java instance connects to the data source. For example, the persistent layer of the java instance may connect to a business object layer in a SAP implementation using Java™ Connector ('JCO') 30. JCO connects non-SAP components written in Java™ to Advanced Business Application Programming ('ABAP') based SAP systems like R/3. Referring to FIG. 1, in a SAP implementation, JCO may be utilized by business object proxies to access SAP system 34. In another embodiment, the persistent layer of the Java instance may connect to a database management system 'DBMS' 35 and legacy system 38 via Java Database Connectivity 'JDBC' 32 utilizing SQL select statements. Once the retrieval of data occurs, values associated with business name attributes may be populated and made available to one or more software applications. In some implementations, relationships among one or more business objects may be stored in a business object proxy so that software applications may traverse the mapping of individual business objects using the ID attribute 46 stored in knowledge header 44 of a knowledge entity.

Figure 4:
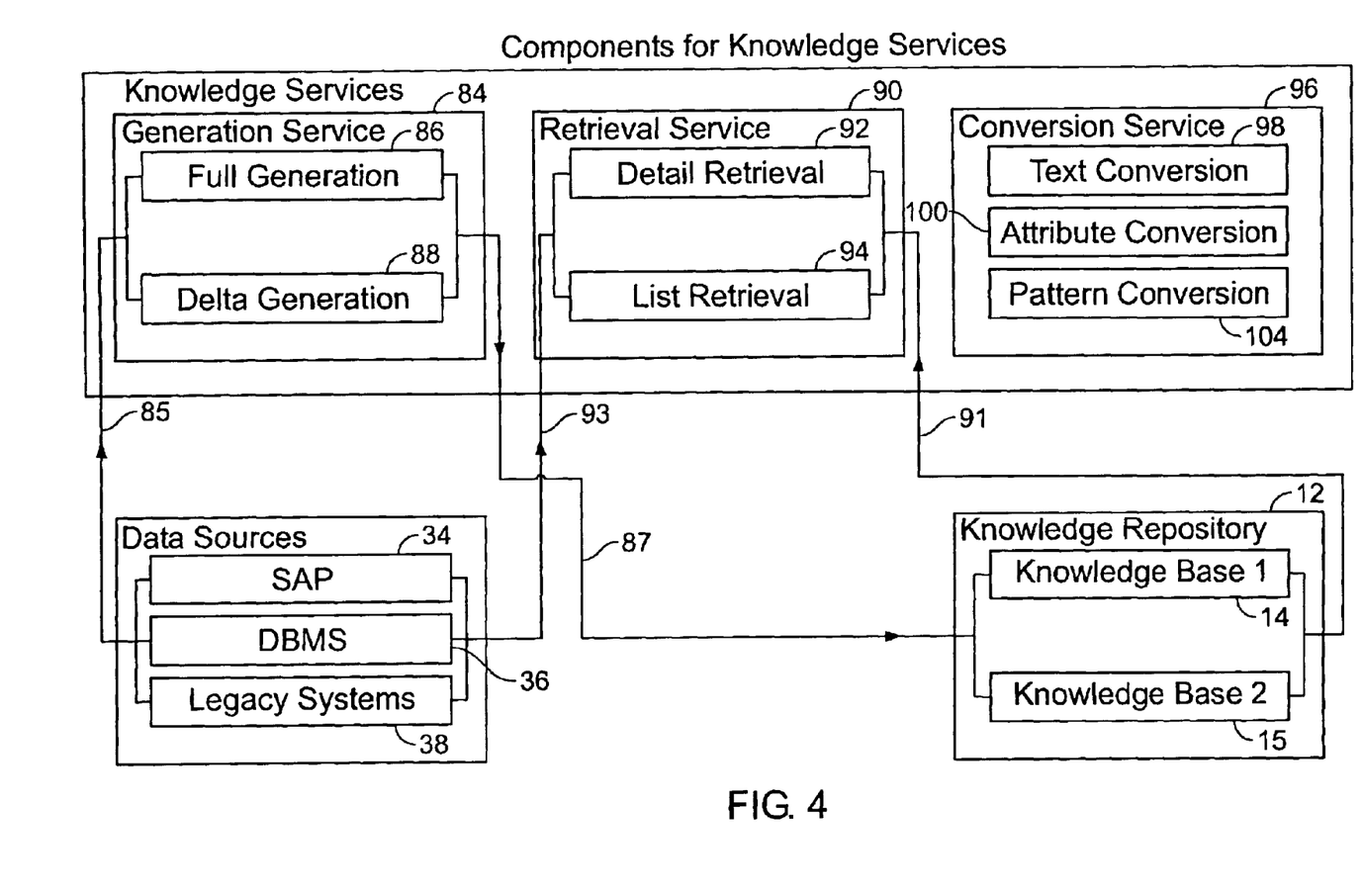
FIG. 4 illustrates the components of a knowledge service.

Referring to FIG. 4, Knowledge services 42 may be provided that include a generation service 84, a retrieval service 90 and a conversion service 96.

As illustrated in FIG. 4, generation service 84 includes a full generation service 86 and a delta generation service 88.

Full generation service 86 provides operations for establishing and configuring a knowledge base. Each knowledge base may be bound to full generation service 86. Full generation service 86 identifies the location of individual business objects and generates meta-definitions representing business object relationships. Full generation service 86 stores these relationships in one or more knowledge entities. In some embodiments, as described previously, meta-definitions may be organized as a hierarchical tree of business objects. Once the meta-definitions of each knowledge entity are generated, full generation service 86 then may store knowledge entities in one or more knowledge bases. As a result, generated knowledge bases reflect the current status of one or more data sources.

Meta-definitions also may contain the relationship between business objects, individual business object types and the identifier for business objects. As illustrated in FIG. 4, line 85 in the diagram indicates the retrieval of information from external data sources and line 87 illustrates storing of that data in knowledge bases 14, 15. In some embodiments, generated meta-definitions from full generation service 86 may not contain data content. Instead, generated meta-definitions include basic attribute information that may be used by a retrieval service 90 to locate and access data content from an original data source.

In one embodiment, full generation service 86 may be executed prior to the retrieval process for a knowledge entity with hierarchical meta-definitions (e.g. a complex combination of business objects). Once executed, full generation service 86 may maintain the relationships between business objects. In other embodiments, where a knowledge entity represents a single business object, full generation service 86 need not be executed prior to execution of retrieval service 90.

Delta generation service 88 is provided that synchronizes knowledge entities and data sources whenever a changing event occurs. In some embodiments, delta generation service 88 may be event-driven and execute based upon receiving a published message from an external data source. Any standard messaging system, such as the Java™ Message Service 'JMS', may be used. In some implementations, messages may be received via a servlet listening to HyperText Transfer Protocol 'HTTP' requests. One or more HTTP requests may trigger delta generation service 88 by passing a knowledge base name, a knowledge entity ID attribute, and one or more actions attached as XML in the HTTP call. In one embodiment, delta generation service 88 also may provide a standard application-programming interface ('API') that may be integrated directly in software applications to trigger delta generation services.

Retrieval services 90 are provided that retrieve data content for run-time business processes. Referring to FIG. 4, retrieval service 90 includes a detail retrieval service 92 and a list retrieval service 94.

Detail retrieval service 92 provides software applications with the contents of individual business objects and may instantiate knowledge entities that may navigate details of each business object. In one embodiment, detail retrieval service 92 may utilize the following methods to retrieve data. First, as illustrated in FIG. 4, detail retrieval service 92 may access 91 knowledge entities stored in knowledge bases 14, 15 in response to a data request from a software application. Next, detail retrieval service 92 may instantiate individual business objects using as input the accessed meta-definitions stored in knowledge entities of one or more knowledge bases. Detail retrieval service 92 then may execute one or more pre-defined data connectivity methods included in the individual business object. Once the business object is instantiated, attribute-value pairs associated with the instantiated business object may be accessed 93 and sent to the software application in response to the data request. In one embodiment, when retrieving a large amount of data, detail retrieval service 92 may automatically divide the data into batches that can reduce server loading and memory consumption. For example, when retrieving a large case database with 50,000 cases, the retrieval service may only instantiate one hundred business objects at a time until all data are retrieved completely.

List retrieval service 94 provides software applications with a list of basic information of knowledge entities 44 and may provide the identifiers of all corresponding business objects relating to knowledge entities. In one embodiment, for example, a set of criteria (e.g., names of customers or a range of order quantity) may be specified by a software application to retrieve a list of knowledge entities that match the criteria via list retrieval service 94. In other embodiments, a software application may use the list retrieval service 74 to retrieve batchs of consecutive knowledge entities for processing. This service may be advantageous when a software application needs to display a list with basic information after performing a search and for improving performance when processing a high volume knowledge base.

Conversion service 96 provides content transformation from one or more knowledge entities to various formats that may be easily processed by software applications. Conversion service 96 may include a text conversion service 98, an attribute conversion service 100, and a pattern conversion service 104.

Text conversion service 98 may automatically traverse the hierarchical structure of a knowledge entity to collect attribute values for each business object represented in the knowledge entity. The values may be automatically concatenated into text formats that may be used for further processing by software applications. For example, software applications may invoke text conversion service 98 to access business object attribute values to generate an index that may be used by a search engine.

Attribute conversion service 100 may be provided to automatically traverse the hierarchical structure of a knowledge entity to collect attribute values for a business objected represented in the knowledge entity. Attribute conversion service 100 differs from text conversion service 98 in that attribute conversion service 100 may store the attribute value information obtained from each business object attribute and transform it into various formats for software applications. In one embodiment, for example, the attribute-value pairs associated with an instantiated business object may be presented to software applications using an XML format that preserves the hierarchical structure of the knowledge entity. In another embodiment, attribute conversion service 100 may flatten the hierarchical structure of a knowledge entity and transform the structure into a flattened XML structure containing only the list of attributes. For those attributes present at multiple levels of the hierarchy, attribute conversion service 100 may concatenate attribute values with pre-defined delimiters. In other embodiments, attribute conversion service 100 may provide flattened attributes to software applications in non-XML based formats such as a list.

Pattern conversion service 104 converts one or more business object attributes into a particular pattern that may be based on certain rules. In one embodiment, the different combination of business object attribute values may be composed into a set of string values that may be treated as a pattern/characteristic for a knowledge entity. For example, the set of string values may provide a security code for access to a specific knowledge entity. In one embodiment, for example, pattern conversion service 104 may be used for providing access control to selected business objects.

Various features of the system may be implemented in hardware, software, or a combination of hardware and software. For example, some features of the system may be implemented in computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. A method of modeling data comprising:

generating at least one knowledge entity wherein each generated knowledge entity is generated from at least one data source and represents the at least one data source from which the generated knowledge entity was generated;

storing the at least one knowledge entity in a knowledge base; and providing a set of knowledge services that synchronize each generated knowledge entity with the at least one data source from which the knowledge entity was generated.

2. The method of claim 1 wherein generating the at least one knowledge entity comprises arranging a hierarchical arrangement of at least one attribute-value pair associated with the at least one data source using an extensible markup language.

3. The method of claim 1 wherein one of the set of knowledge services comprises a service that updates the at least one knowledge entity in response to receiving an event representing a change in the at least one data source from which the at least one knowledge entity was generated.

4. The method of claim 1 wherein one of the set of knowledge services comprises a service that updates the at least one data sources from which the at least one knowledge entity was generated in response to receiving an event representing a change in the at least one knowledge entity.

5. The method of claim 1 wherein the set of knowledge services further comprises:

a service that provides a set of data retrieval services that access the at least one data source from which the at least one knowledge entity was generated; and a service that provides a set of data conversion services that translate data content, the data content stored in the at least one data source from which the at least one knowledge entity was generated, to an alternative format.

6. The method of claim 5 wherein one of the set of data retrieval services comprises accessing at least one attribute-value pair associated with the at least one data source from which the at least one knowledge entity was generated in response to an access request, the access request identifying the at least one knowledge entity.

7. The method of claim 6 wherein accessing the at least one attribute-value pair comprises:

instantiating a business object using the access request and a pre-defined data connectivity connection, the pre-defined data connectivity connection previously defined for the at least one data source from which the at least one knowledge entity was generated; and executing the pre-defined connectivity connection associated with the business object.

8. The method of claim 5 wherein one of the set of data retrieval services comprises accessing administrative information stored in the at least one knowledge entity in response to a list retrieval request, the list retrieval request identifying the at least one knowledge entity.

9. The method of claim 5 wherein one of the set of conversion services comprises generating a formatted data set from the at least one knowledge entity using a data conversion algorithm and a conversion request, the conversion request identifying the at least one knowledge entity and a data format.

10. The method of claim 5 wherein one of the set of conversion services comprises:

receiving a pattern conversion request, the pattern conversion request identifying the at least one knowledge entity and a data pattern;

comparing at least one attribute-value pair in the at least one knowledge entity to the data pattern; and granting access to the at least one attribute-value pair based on the comparison.

11. An article comprising a machine-readable medium storing machine-readable instructions that, when applied to the machine, cause the machine to:

generate at least one knowledge entity wherein each generated knowledge entity is generated from at least one data source and represents the at least one data source from which the generated knowledge entity was generated;

store the at least one knowledge entity in a knowledge base; and provide a set of knowledge services that synchronize each generated knowledge entity with the at least one data source from which the knowledge entity was generated.

12. The article of claim 11 including instructions that, when applied to the machine, cause the machine to arrange a hierarchical arrangement of at least one attribute-value pair associated with the at least one data source using an extensible markup language.

13. The article of claim 11 including instructions that, when applied to the machine, cause the machine to update the at least one knowledge entity in response to receiving an event representing a change in the at least one data source from which the at least one knowledge entity was generated.

14. The article of claim 11 including instructions that, when applied to the machine, cause the machine to update the at least one data sources from which the at least one knowledge entity was generated in response to receiving an event representing a change in the at least one knowledge entity.

15. The article of claim 11 including instructions that, when applied to the machine, cause the machine to:
   provide a set of data retrieval services that access the at least one data source from which the at least one knowledge entity was generated; and
   provide a set of data conversion services that translate data content, the data content stored in the at least one data source from which the at least one knowledge entity was generated, to an alternative format.

16. The article of claim 15 including instructions that, when applied to the machine, cause the machine to access at least one attribute-value pair associated with the at least one data source from which the at least one knowledge entity was generated in response to an access request, the access request identifying the at least one knowledge entity.

17. The article of claim 16 including instructions that, when applied to the machine, cause the machine to:
   instantiate a business object using the access request and a pre-defined data connectivity connection, the pre-defined data connectivity connection previously defined for the at least one data source from which the at least one knowledge entity was generated; and
   execute the pre-defined connectivity connection associated with the business object.

18. The article of claim 15 including instructions that, when applied to the machine, cause the machine to access administrative information stored in the at least one knowledge entity in response to a list retrieval request, the list retrieval request identifying the at least one knowledge entity.

19. The article of claim 15 including instructions that, when applied to the machine, cause the machine to generate a formatted data set from the at least one knowledge entity using a data conversion algorithm and a conversion request, the conversion request identifying the at least one knowledge entity and a data format.

20. The article of claim 15 including instructions that, when applied to the machine, cause the machine to:
   compare at least one attribute-value pair in the at least one knowledge entity to a data pattern in response to a pattern conversion request, the pattern conversion request identifying the at least one knowledge entity and the data pattern; and
   grant access to the at least one attribute-value pair based on the comparison.

21. A system comprising:
   a computer network;
   a directory coupled to the network, the directory storing a data repository;
   a service delivery device coupled to the network, the service delivery device including a processor and memory storing instructions that, in response to receiving a request for access to a service, cause the processor to:
   generate at least one knowledge entity wherein each generated knowledge entity is generated from at least one data source and represents the at least one data source from which the generated knowledge entity was generated;
   store the at least one knowledge entity in a knowledge base; and
   provide a set of knowledge services that synchronize each generated knowledge entity with the at least one data source from which the knowledge entity was generated.

22. The system of claim 21 wherein the memory stores instructions that, in response to receiving the request, cause the processor to arrange a hierarchical arrangement of at least one attribute-value pair associated with the at least one data source using an extensible markup language.

23. The system of claim 21 wherein the memory stores instructions that, in response to receiving the request, cause the processor to update the at least one knowledge entity in response to receiving an event representing a change in the at least one data source from which the at least one knowledge entity was generated.

24. The system of claim 21 wherein the memory stores instructions that, in response to receiving the request, cause the processor to update the at least one data sources from which the at least one knowledge entity was generated in response to receiving an event representing a change in the at least one knowledge entity.

25. The system of claim 21 wherein the memory stores instructions that, in response to receiving the request, cause the processor to:
   provide a set of data retrieval services that access the at least one data source from which the at least one knowledge entity was generated; and
   provide a set of data conversion services that translate data content, the data content stored in the at least one data source from which the at least one knowledge entity was generated, to an alternative format.

26. The system of claim 25 wherein the memory stores instructions that, in response to receiving the request, cause the processor to access at least one attribute-value pair associated with the at least one data source from which the at least one knowledge entity was generated in response to an access request, the access request identifying the at least one knowledge entity.

27. The system of claim 26 wherein the memory stores instructions that, in response to receiving the request, cause the processor to:
   instantiate a business object using the access request and a pre-defined data connectivity connection, the pre-defined data connectivity connection previously defined for the at least one data source from which the at least one knowledge entity was generated; and
   execute the pre-defined connectivity connection associated with the business object.

28. The system of claim 25 wherein the memory stores instructions that, in response to receiving the request, cause the processor to access administrative information stored in the at least one knowledge entity in response to a list retrieval request, the list retrieval request identifying the at least one knowledge entity.

29. The system of claim 25 wherein the memory stores instructions that, in response to receiving the request, cause the processor to generate a formatted data set from the at least one knowledge entity using a data conversion algorithm and a conversion request, the conversion request identifying the at least one knowledge entity and a data format.

30. The system of claim 25 wherein the memory stores instructions that, in response to receiving the request, cause the processor to:
- compare at least one attribute-value pair in the at least one knowledge entity to a data pattern in response to a pattern conversion request, the pattern conversion request identifying the at least one knowledge entity and the data pattern; and
- grant access to the at least one attribute-value pair based on the comparison.

31. The method of claim 1, wherein the knowledge entities store meta-definitions that reference one or more objects in the at least one data source from which the knowledge entity was generated.

32. The method of claim 10, wherein one or more of the objects referenced by one of the stored meta-definitions are accessed in response to a request.

* * * * *